United States Patent [19]

Hirahara et al.

[11] Patent Number: 5,845,723
[45] Date of Patent: Dec. 8, 1998

[54] CONTROL DEVICE OF A START-ASSIST SYSTEM

[75] Inventors: Hideto Hirahara; Masaaki Kano, both of Yokohama; Minori Higuchi, Kawasaki; Haruyuki Hosoya, Yokohama, all of Japan

[73] Assignee: Isuzu Motors Ltd., Tokyo, Japan

[21] Appl. No.: 669,945

[22] Filed: Jun. 25, 1996

[51] Int. Cl.⁶ ............... B60G 5/00; B60G 11/46; B60G 17/00

[52] U.S. Cl. .......... 180/24.02; 280/5.5; 280/678; 280/683; 280/124.16

[58] Field of Search ............... 180/24.02, 209; 280/711, 714, 712, 704, DIG. 1, 676, 677, 678, 680, 683, 6.1, 6.11, 5.5, 5.513, 6.159, 124.157, 124.16, 124.163

[56] References Cited

U.S. PATENT DOCUMENTS

| | | | |
|---|---|---|---|
| 3,053,335 | 9/1962 | Gnade et al. | 280/712 |
| 4,141,430 | 2/1979 | Eddy, Jr. | 180/24.02 |
| 4,993,729 | 2/1991 | Payne | 180/24.02 |
| 5,052,713 | 10/1991 | Corey et al. | 280/711 |
| 5,522,469 | 6/1996 | Hosoya et al. | 180/24.02 |

FOREIGN PATENT DOCUMENTS 7-237425  9/1995  Japan .

*Primary Examiner*—Peter C. English
*Attorney, Agent, or Firm*—Antonelli, Terry, Stout & Kraus, LLP

[57] ABSTRACT

A start-assist system for a vehicle using air actuators attached to one of rear axles, behaving as a drive axle, is provided to increase the load to the drive axle and the traction when the vehicle starts to run. A control device supplies air to the air actuators when the unladen vehicle is stopped, but discharges air from the air actuators, while keeping residual air in them, when the laden vehicle is stopped or when the vehicle runs at a speed over a predetermined speed. Thus the air actuators are protected from collapsing.

18 Claims, 12 Drawing Sheets

CONTROL DEVICE OF A START-ASSIST SYSTEM

FIELD OF THE INVENTION

This invention relates to a control device for a start-assist system installed in a vehicle of a type having two rear axles.

BACKGROUND OF THE INVENTION

FIG. 9 is a schematic explanatory view of a vehicle having two rear axles. A large vehicle, labelled 1, has a front axle 21 mounted in a front location on a frame 10 to support front wheels 21a. The vehicle 1 has two rear axles 31 and 32 which support wheels 31a and wheels 32a.

These two rear axles 31, 32 are supported by the frame 10 via a suspension 40, frame 10 supports cargo section 50 thereon.

The whole weight WG of the vehicle 1 including the cargo section 50 is divided into a load WF applied to the front wheels 21a and a load WR applied to the rear wheels 31a and 32a, and the ground G bears both these loads WF and WR.

Since the vehicle 1 has two axles 31 and 32 at its rear, the load WR applied to the entirety of the rear half of the vehicle 1 is divided into a load WRF, supported by the forward rear axle 31 and a load WRR supported by the rear rear axle 32. By limiting the maximum possible load applied to a single axle in this manner, vehicles for carrying larger loads can be constructed.

Among various vehicles having two rear axles, so-called 6×2 vehicles have been developed, in which the power transmission system is simplified by using the forward rear axle 31 as a drive axle 31 as a drive axle for receiving the drive force from the engine and using rear rear axle 32 as an idler axle which does not receive the drive force.

In these 6×2 vehicles, the drive wheels 31a must generate a sufficient propulsive force. In this connection, the load WRF applied to the wheels 31a must be large enough to generate a sufficient propulsive force between the wheels 31a and the ground G.

When the vehicle is laden, the load WRF applied to the drive axle 31 is large enough to generate a sufficient propulsive force at the wheels 31a.

However, when the vehicle 1 is unladen, the load WRF to the drive axle 31 may be too small, and the wheels 31a may fail to produce a sufficient propulsive force against the ground G. In particular, when the vehicle is going to start moving on ground having a low friction coefficient, the vehicle often fails to start successfully due to slippage of the wheels 31a.

The present Applicant previously proposed a start-assist system for use in a vehicle configured to drive one of two rear axles, as described in Japanese Patent Application No. 6-30087.

The invention of the above application uses an air actuator for adjusting the load to the drive axle and a level sensor for detecting a change in load to the axles and for controlling the behavior of the air actuator, in order to increase the driving force exerted when the vehicle starts to move.

However, since the above start-assist system uses an air actuator having a diaphragm, if air is released too much from the air actuator, the air actuator may collapse and damage the diaphragm when the drive axle vibrates.

OBJECT AND SUMMARY OF THE INVENTION

It is therefore an object of the present invention to provide a control device for a start-assist system overcoming the above-indicated disadvantages.

According to an aspect of the invention, there is provided a control device for a start-assist system equipped in a vehicle having two rear axles, one of which is a drive axle, and including an air actuator attached to the drive axle, in which the control device comprises a speed sensor for detecting the speed of the vehicle; a level sensor for detecting loads applied to the axles, an air supply source for supplying compressed air to the air actuator; a first valve disposed in an air conduit for supplying air to the air actuator; a second valve for releasing air from the air actuator; a residual pressure valve disposed on the air discharge side of the second valve; and control means for controlling the first valve and the second valve.

The control means opens the first valve to introduce air to the air actuator upon detecting that the vehicle is unladen when it stops, and opens the second valve to release air from the air actuator while leaving a residual pressure therein when the speed of the vehicle is above a predetermined value or when the vehicle is laden when it stops.

DETAILED DESCRIPTION OF THE PREFERRED EMBODIMENTS

Figure 4:
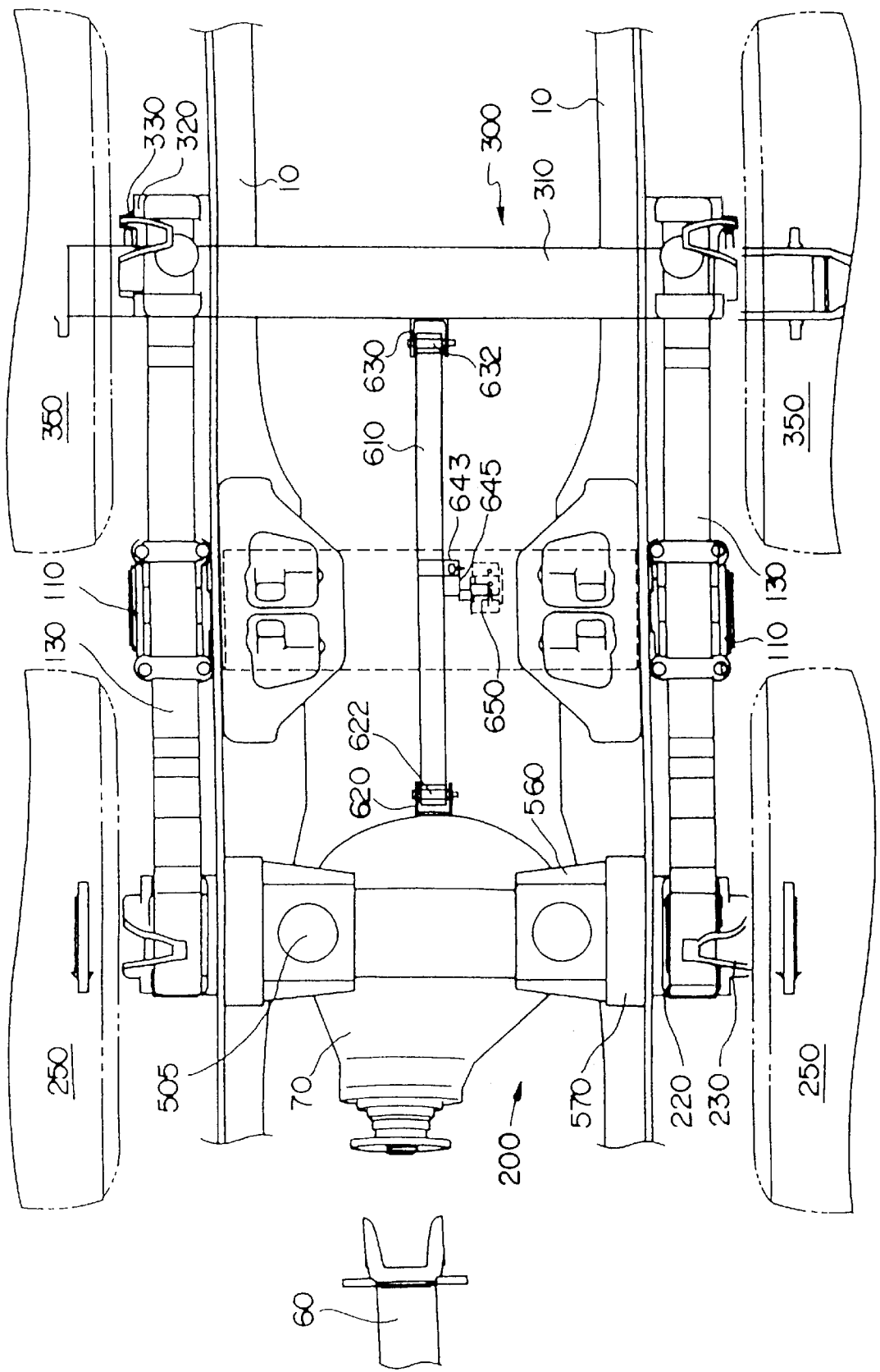
FIG. 4 is a plan view of a vehicle equipped with a start-assist system in accordance with the present invention.
Figure 5:
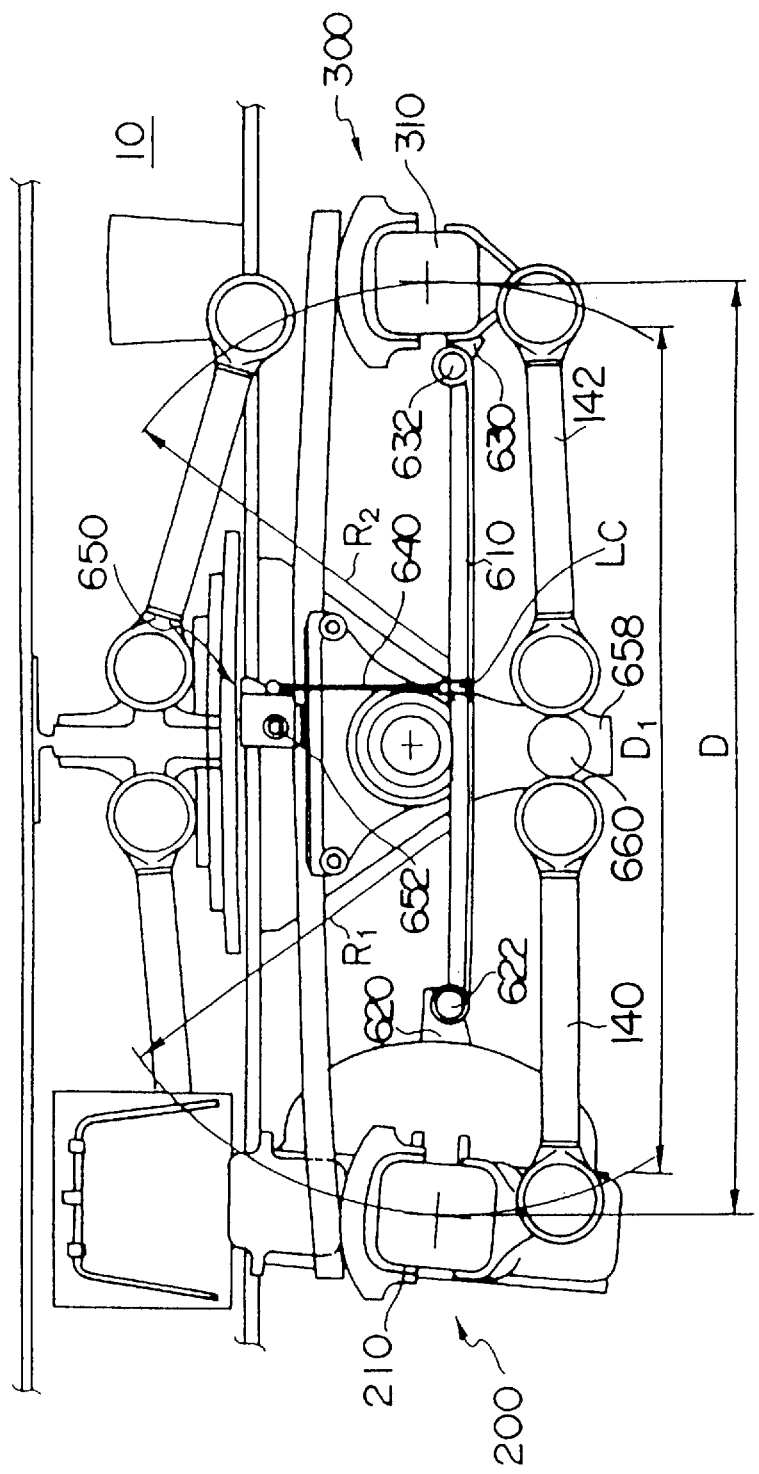
FIG. 5 is a side elevation of the vehicle of FIG. 4.
Figure 6:
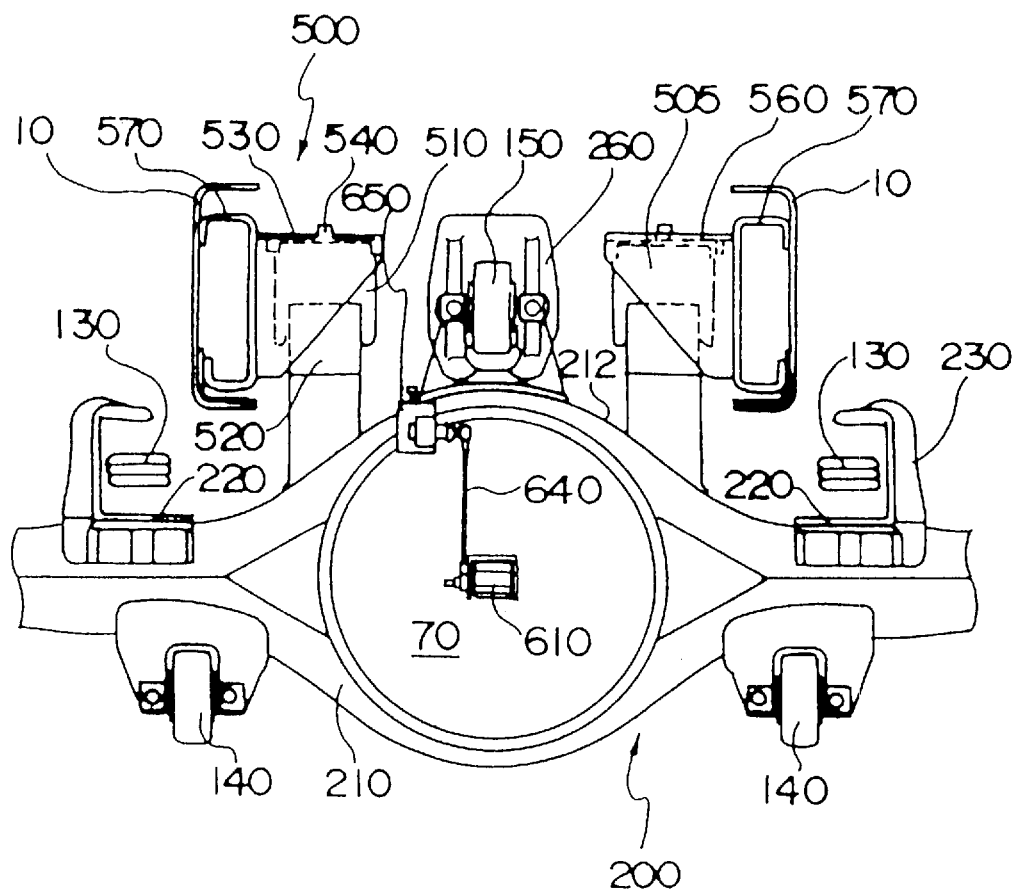
FIG. 6 is a front elevation of a drive axle.

FIGS. 4 to 6 schematically show a start-assist system equipped on a vehicle having a trunnion suspension to increase the drive force required when the vehicle starts to run.

The vehicle has a frame 10 disposed on the right and left sides of the vehicle body to support a drive axle 200 and an idler axle 300.

An engine disposed at the front of the vehicle and a propeller shaft 60 coupled to a gear box transmit power to a differential gear mechanism contained in a differential gear case 70 which is integral with the drive axle 200. The trunnion suspension has trunnion brackets 110 fixed on the lower surface of the frame 10. Each trunnion bracket 110 pivotably supports a trunnion shaft which in turn supports a central portion of a leaf spring 130.

The leaf spring 130 is a laminated plate member made by stacking several to ten leaf springs.

The drive axle 200 is a unit including a drive shaft rotatably contained in a hollow housing 210 and supporting drive wheels 250 at opposite ends. In general, two drive wheels 250 are provided at each end of the drive shaft, giving four in total.

Provided on the housing 210 of the drive axle 200 is a sliding sheet 220 which receives one end of the leaf spring 130. The leaf spring exerts a resilient force for urging the drive axle 200 onto the ground. Spring pressers 230 are provided at opposite ends of the drive axle 200.

A first torque rod 140 is attached to the lower surface of the drive shaft housing 210 via a bracket. The first torque rod is coupled to a second torque rod 142 through a coupling member 658 extending through the trunnion bracket 110. The second torque rod 142 is attached to the lower surface of the idler shaft housing 310 via a bracket.

The idler axle 300 does not directly receive the driving force from the engine, but rotatably supports idler wheels 350. In general, two idler wheels 350 are provided at each end of the idler axle, giving four in total; however, there may be only one at each end. A sliding sheet 320 is provided on housing 310 of idler axle 300 and receives the second end of leaf spring 130. Spring pressers 330 are provided at opposite ends of the idler axle 300.

A central portion of the drive axle housing 210 projects upward and downward for containing the differential gear case 70. A bracket 260 is mounted on the top 212 of the projecting portion, and a third torque rod 150 is coupled to bracket 260.

With the above-explained construction of the trunnion suspension, any appropriate ratio of loads distributed to both axles can be selected by appropriately determining the distance between the center of the trunnion shaft 660 and the center of the drive axle 200, and the distance between the center of the trunnion shaft 660 and the center of the idler axle 300. The drive axle 200 and the idler axle 300 can move along circular orbits of radii R1 and R2, and the distance between the two axles varies between D and D1.

A start-assist system to which the invention is applied is mounted on the drive axle 200.

The start-assist system 500 includes air actuators 505 and their mounting structure. Each air actuator 505 comprises a diaphragm 510, a piston member 520 disposed under the diaphragm 510, and an upper plate 530 disposed on the diaphragm 510. A lower portion of the diaphragm 510 is attached to a bracket on the drive axle. An upper portion of the diaphragm 510 is attached to a bracket on the frame 10.

Used as the vehicle frame 10 is a channel material having a channel-shaped cross section, for example. An attachment member 570 of the frame-side bracket is fixed to the inner side of the frame 10. A bracket 560, opening downward, is integrally mounted to the attachment member 570 and securely contains the upper plate 530 of the air actuator 505 inside. An air inlet 540 of the air actuator 505 projects upward, passing through the bracket 560.

The air inlet 540 is connected to a compressed air source through an air supply pipe which will be explained later. Since large vehicles, in general, are equipped with an air compressor and a high-pressure tank for assisting clutching and braking actions, the source of the compressed air can be utilized for this purpose.

Under the condition with no compressed air introduced to the air actuators 505, the drive axle 200 and the idler axle 300 receive loads with a ratio equal to that in an ordinary trunnion suspension.

When compressed air is introduced into the air actuators 505, the diaphragm 510 expands and biases the drive axle 200 toward the ground. This biasing force increases the load applied to the drive wheels 250 and hence increases the propulsive force produced between the drive wheels 250 and the ground.

Therefore, if the start-assist system is activated when the vehicle starts to run where a large propulsive force is required, the vehicle starts smoothly and reliably.

The air actuator used as an element of the start-assist system is liable to break down because the diaphragm, in particular, is made of a flexible material. The air actuator is therefore protected by locating it at the inner side of the vehicle frame and by covering it with the bracket 560.

The trunnion suspension permits the housing to rotate about the center line of the vehicle axle when the vehicle axle moves vertically. This rotation causes deviations at the upper support portion and other support portions of the air actuator; however, adverse effects on of these deviations can be minimized by locating the air actuators on the drive axle housing 210.

Figure 7:
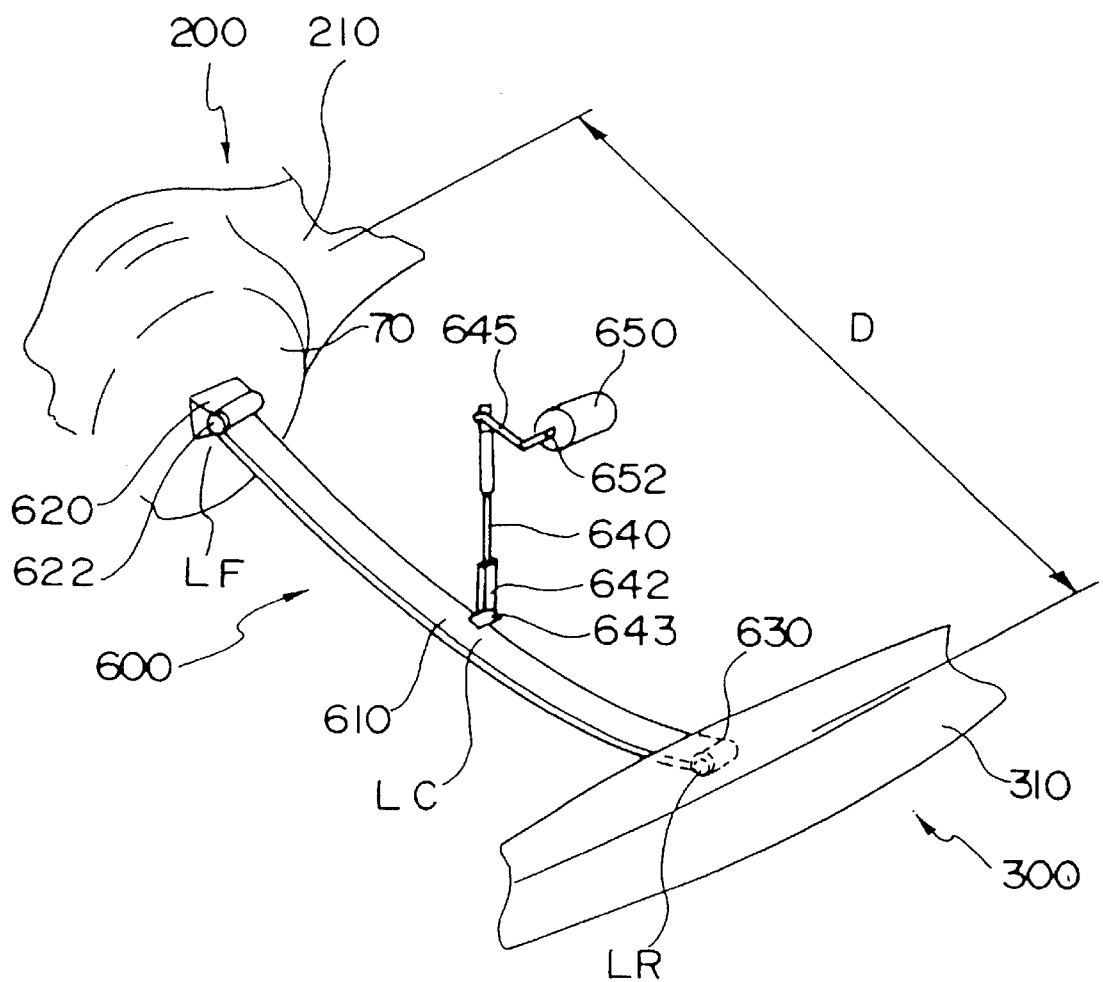
FIG. 7 is an explanatory view of a load detector.

In FIG. 7, an axle-load detector 600 comprises a leaf spring 610 and a level sensor 650 for detecting a change in position of the center of the leaf spring 610.

The two-rear-axle vehicle has a first rear axle 200 and a second rear axle 300. The first rear axle, nearer to the front axle, comprises the housing 210 containing an axle, and a differential gear case 70, and behaves as a drive axle. The second rear axle 300 has housing 310 and behaves as an idler axle which does not receive the driving force. It is of course possible to configure the second rear axle 300 to behave as a drive axle.

A front end portion of the leaf spring 610 is supported on a rear portion of the differential gear case 70 of the drive axle 200 via a bracket 620. A rear end portion of the leaf spring 610 is supported on a front portion of the idler axle housing 310 via a bracket 630. A bushing 622 is provided between the bracket 620 and the leaf spring 610 to absorb relative twist or other stress between the bracket and the leaf spring. Also the idler axle bracket 630 similarly supports the leaf spring via a bushing 632.

The leaf spring 610 supports the lower end of a vertically extending rod 640 at its central portion via mount members 642, 643. The upper end of the rod 640 is coupled to a horizontally extending arm 645 which rotates a shaft 652 of the level sensor 650.

The level sensor 650 is fixed to the chassis of the vehicle to electrically detect the amount of rotation of the shaft 652.

When any change occurs in loads applied to the drive axle 200 and the idler axle 300, the suspension deforms, changing the vertical distance between the position of the rod support portion LC of the leaf spring 610 and the position of the level sensor 650. Therefore, by electrically detecting the change in this distance, loads applied to the drive axle 200 and the idler axle 300 can be detected.

Among various types of suspension for two-rear-axle vehicles, there is one in which the inter-axle distance D varies with changes in heights of the axles 200 and 300 from the ground.

If the shaft-load detector 600 is used on a vehicle having a suspension of this type, the sensitivity of detecting loads to axles can be improved.

That is, as the inter-axle distance D is increased by the load with respect to the corresponding distance in the unladen condition, the distance between the front-end attachment LF and the rear-end attachment LR of the leaf spring 610 is increased, and the rod support portion LC rises, bringing the rod 640 upward.

Since the rod 640 rotates the shaft 652 of the sensor 650 by the amount of the displacement of the leaf spring 610 plus the vertical displacements of the axles 200 and 300 from the ground, the angle of rotation of the shaft 652 becomes large, and the sensitivity is improved.

Figure 8A:
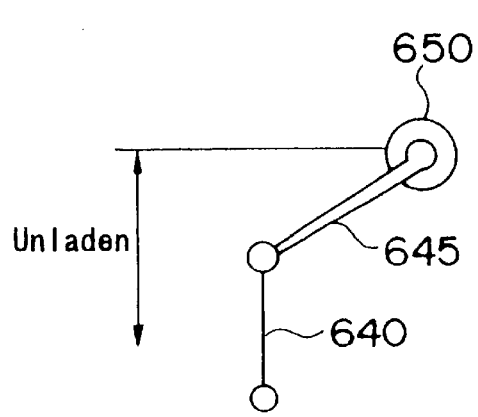
FIGS. 8A and 8B are explanatory views of a level sensor.
Figure 8B:
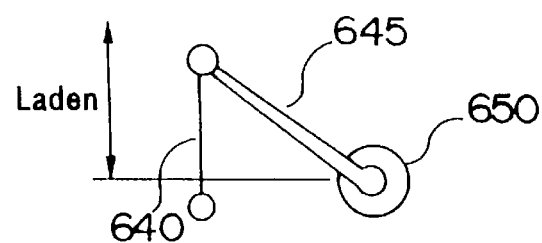
Figure 9:
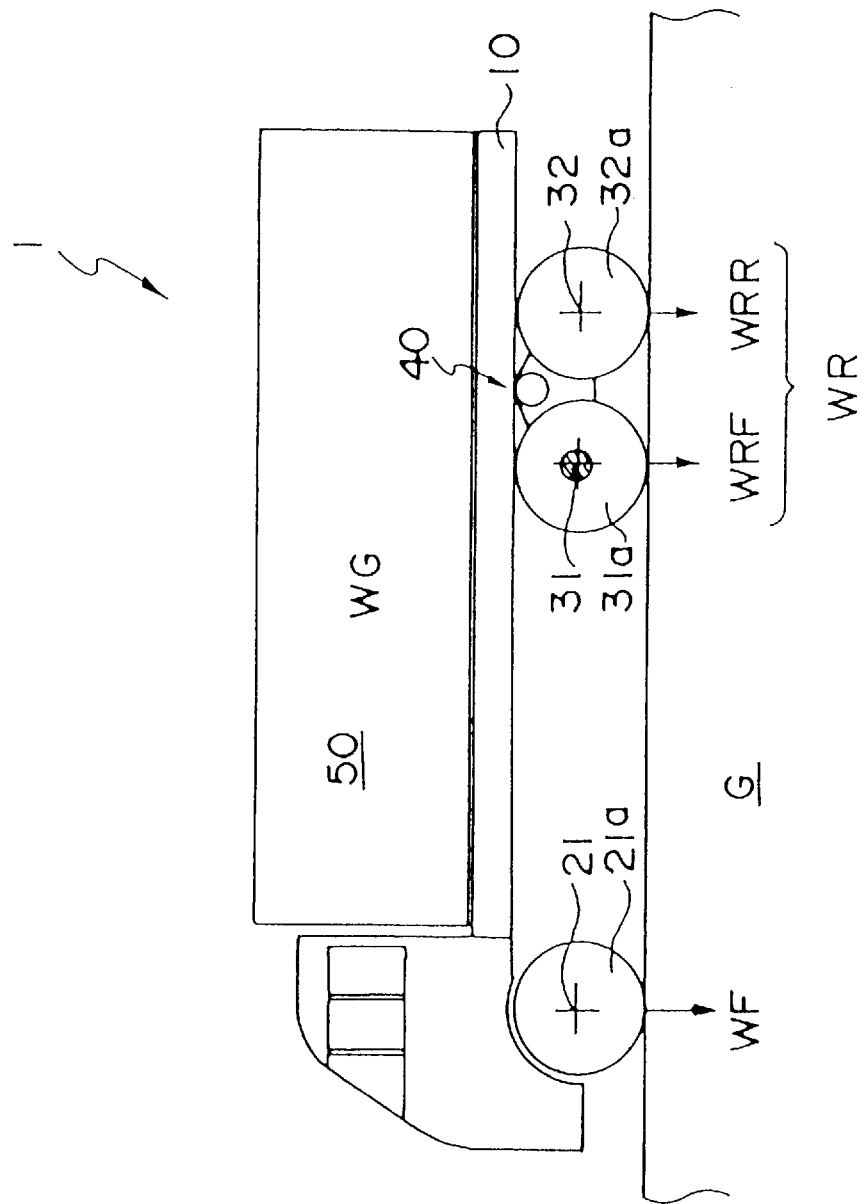
FIG. 9 is an explanatory view showing a general aspect of a vehicle having two rear axles.

The sensor 650 varies in its output voltage depending on the position of the arm 645. Thus, CPU 850 determines that the vehicle is laden when the arm is elevated by the rod 640 beyond a given position, as shown in FIG. 8B, and determines that the vehicle is unladen when the rod 640 remains below the given position, as shown in FIG. 8A.

Figure 1:
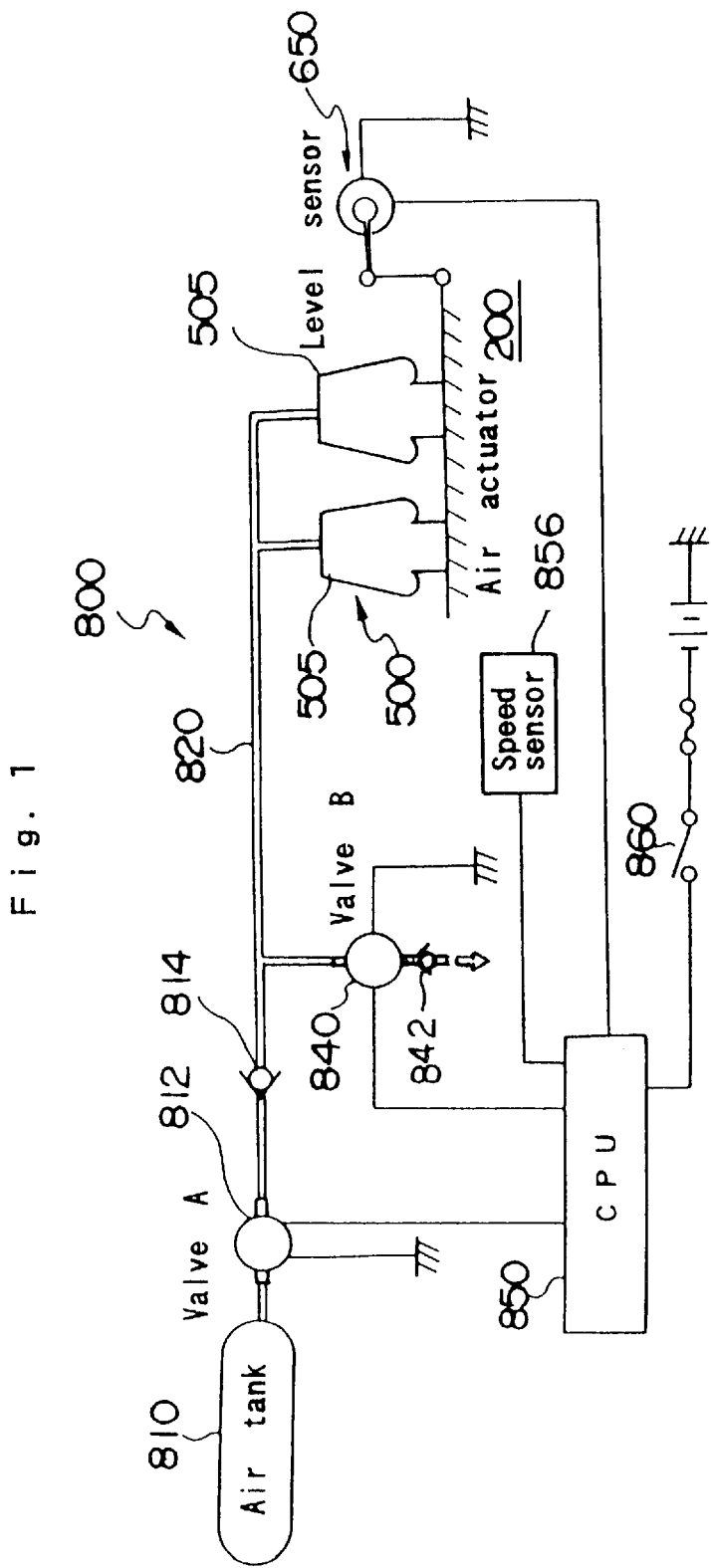
FIG. 1 is an explanatory view of a control device according to an embodiment of the invention.

FIG. 1 is an explanatory view showing a general aspect of a control device according to a first embodiment of the invention.

The control device 800 of the start-assist system comprises an air tank 810 containing air which is introduced into the air actuators 505 of the start-assist system 500 through a first control valve (A) 812, a check valve 814 and a conduit 820, and increases the load to the drive axle 200.

CPU 850, used as a control unit, is activated by an actuator switch 860 and receives a signal from the level sensor 650 and a signal from a speed sensor 856 to control the first valve (A) 812 and a second valve (B) 840. The first valve 812 controls the supply of air to the conduit 820, and the second valve 840 includes at its outlet side a residual pressure valve 842 which is configured to release air from the conduit 820 while keeping a residual pressure in the conduit 820. The residual pressure valve 842 may be constructed as a spring loaded check valve.

Figure 2:
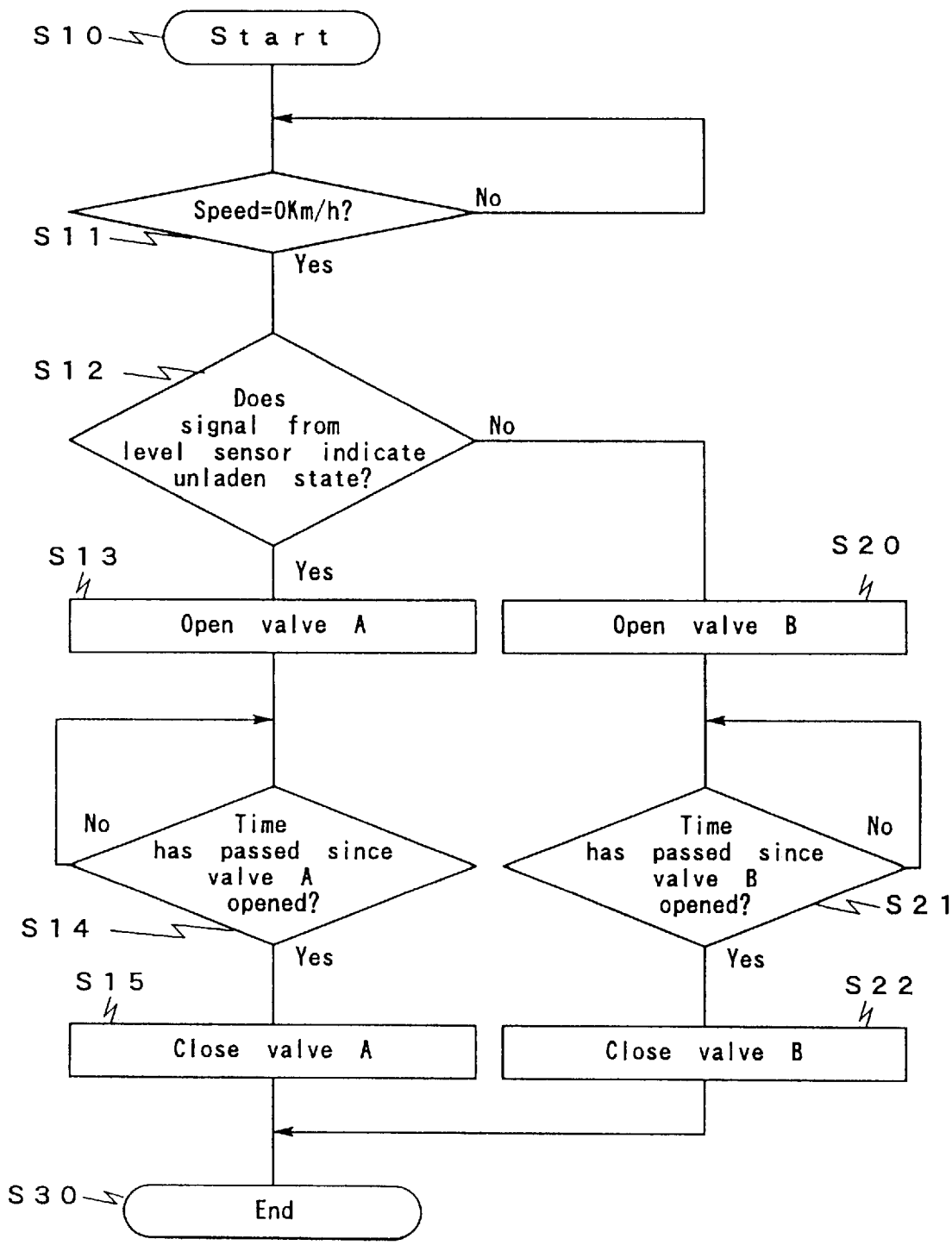
FIG. 2 is a flow chart of the process of control by the control device according to embodiment of FIG. 1.

FIG. 2 is a flow chart showing a process of control by the control device 800.

The process starts with step S10. In step S11, the speed of the vehicle is detected. If the vehicle is stopped, the process goes to step S12 and detects whether the output signal of the level sensor 650 indicates the unladen condition. If the output signal of the level sensor 650 shows the unladen condition, then the flow proceeds to step S13 and opens the first valve (A) 812 to introduce air into the air actuators 505. In step S14, when it is detected that a given time has passed after the valve 812 is opened, the valve is closed in step S15. Thus, the air actuators expand enough to make the start-assist system operative, and the process ends.

If the output of the level sensor indicates the laden condition in step S12, the control goes to step S20, and the second valve (B) 840 is opened to release air from the air actuators 505. In step S21, when a predetermined time has passed after the valve 840 is opened, the valve is closed in step S22. Thus, the start-assist system is deactivated. In this state, a predetermined residual pressure is left in both the conduit 820 and the air actuators 505 by function of the residual pressure valve 842.

Following either step S15 or step S22, the process ends in step S30.

Figure 3:
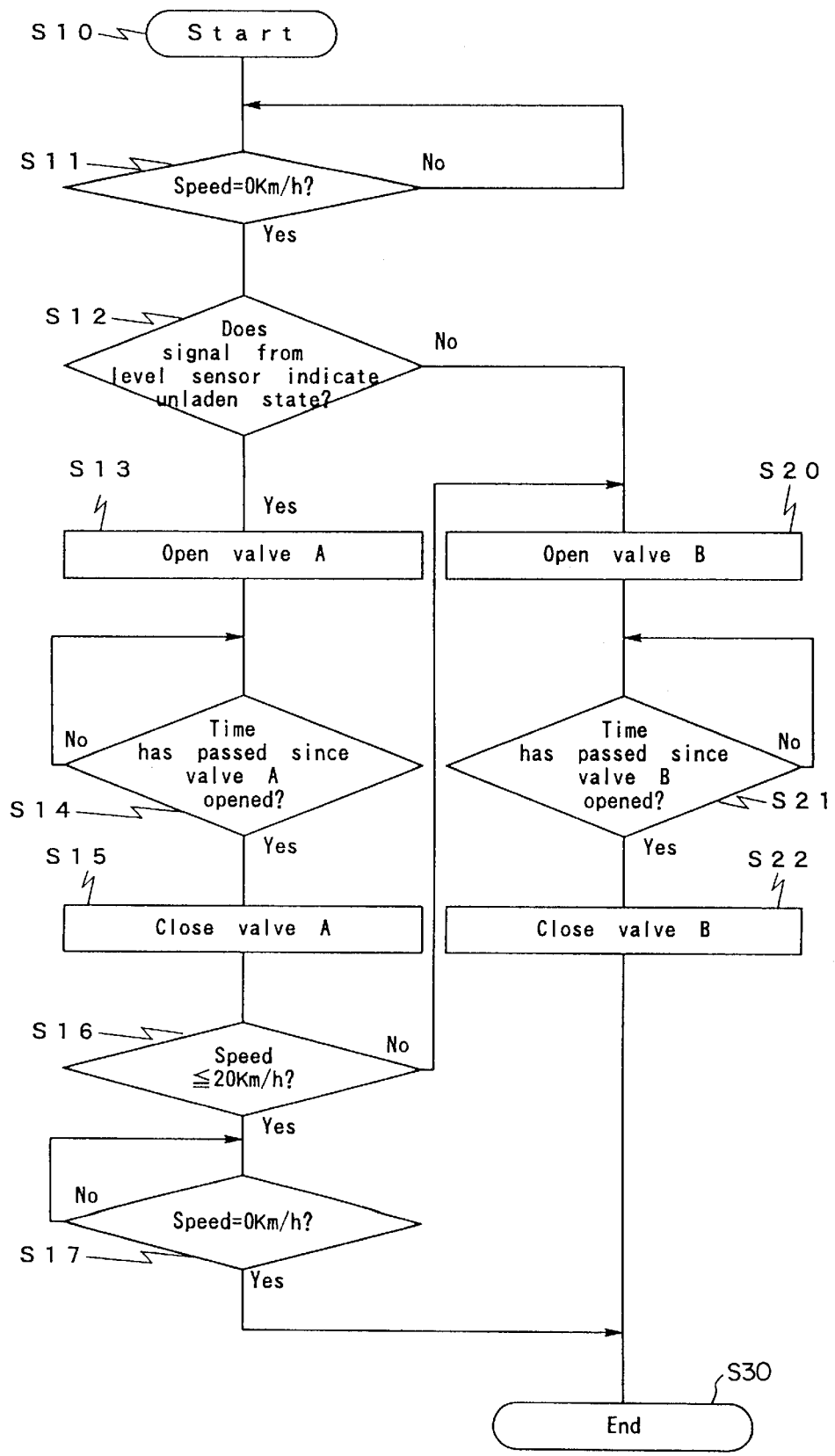
FIG. 3 is a flow chart of a modified process of control by the control device according to the embodiment of FIG. 1.

FIG. 3 is another flow chart showing the process of control by a modified version of the control device 800.

This process of control is substantially the same as the process of control shown in the flow chart of FIG. 2, except that after step S15 has closed valve 812 and the speed of the vehicle has reached 20 Km/h in step S16, the flow goes to step S20 and opens the second valve 840 to release air from the air actuators 505 while keeping a residual pressure in the conduit 820. While the vehicle speed is at or below 20 Km/h, the speed is monitored in step S17, and if the vehicle stops, the process ends in step S30. Likewise, after step S22, the process ends at step S30.

Figure 10:
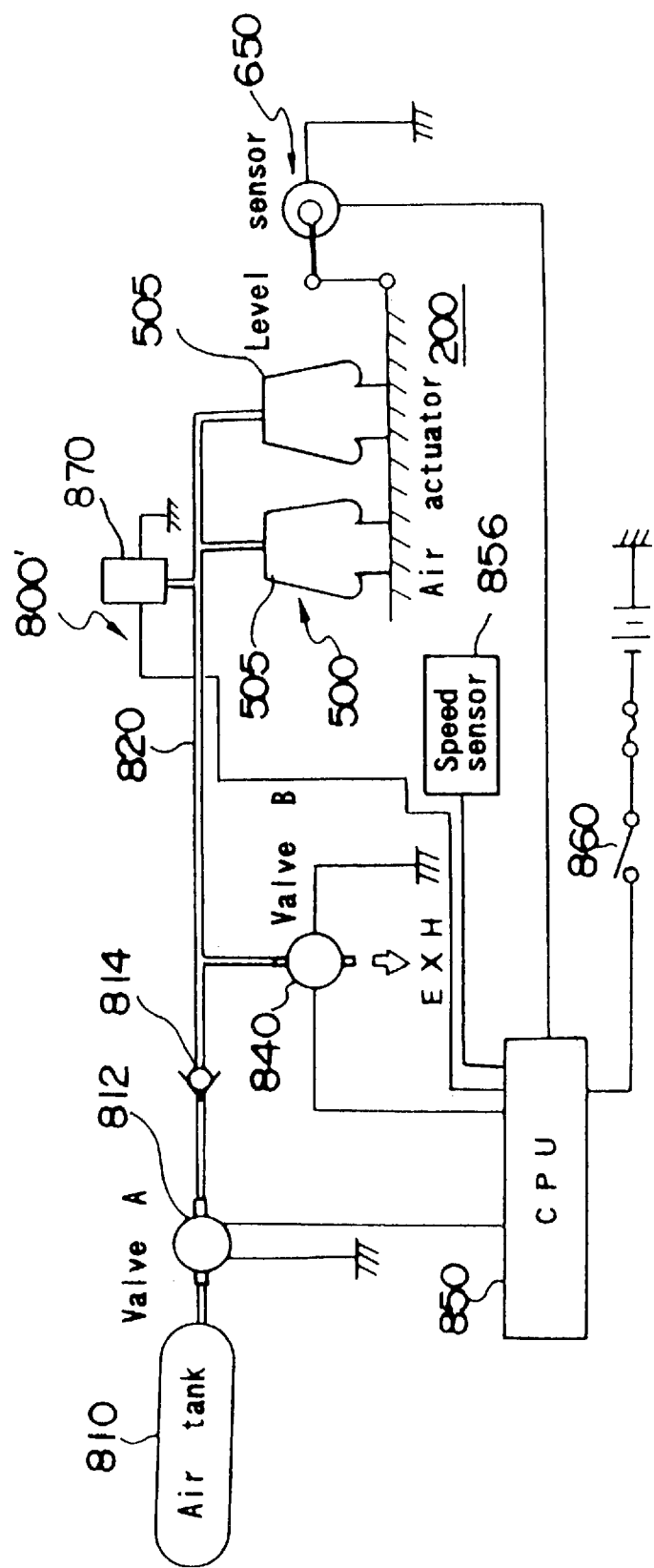
FIG. 10 is a block diagram showing another embodiment of the invention.

FIG. 10 is an explanatory view of another modified version of the control device 800', in which a pressure detecting switch 870 is used in lieu of the residual pressure valve 842 as a means for releasing air while keeping a residual pressure in the air actuators 505.

The pressure detecting switch 870 is provided in the conduit 820 communicating with the air actuators 505, and detects the pressure within the air actuators 505.

The pressure detecting switch 870 supplies an output when the air pressure in the air actuators is above a predetermined value, and stops its output when the pressure drops below the predetermined value.

CPU 850 detects the output signal from the pressure detecting switch 870 and releases air from the air actuators while leaving a residual pressure.

Figure 11:
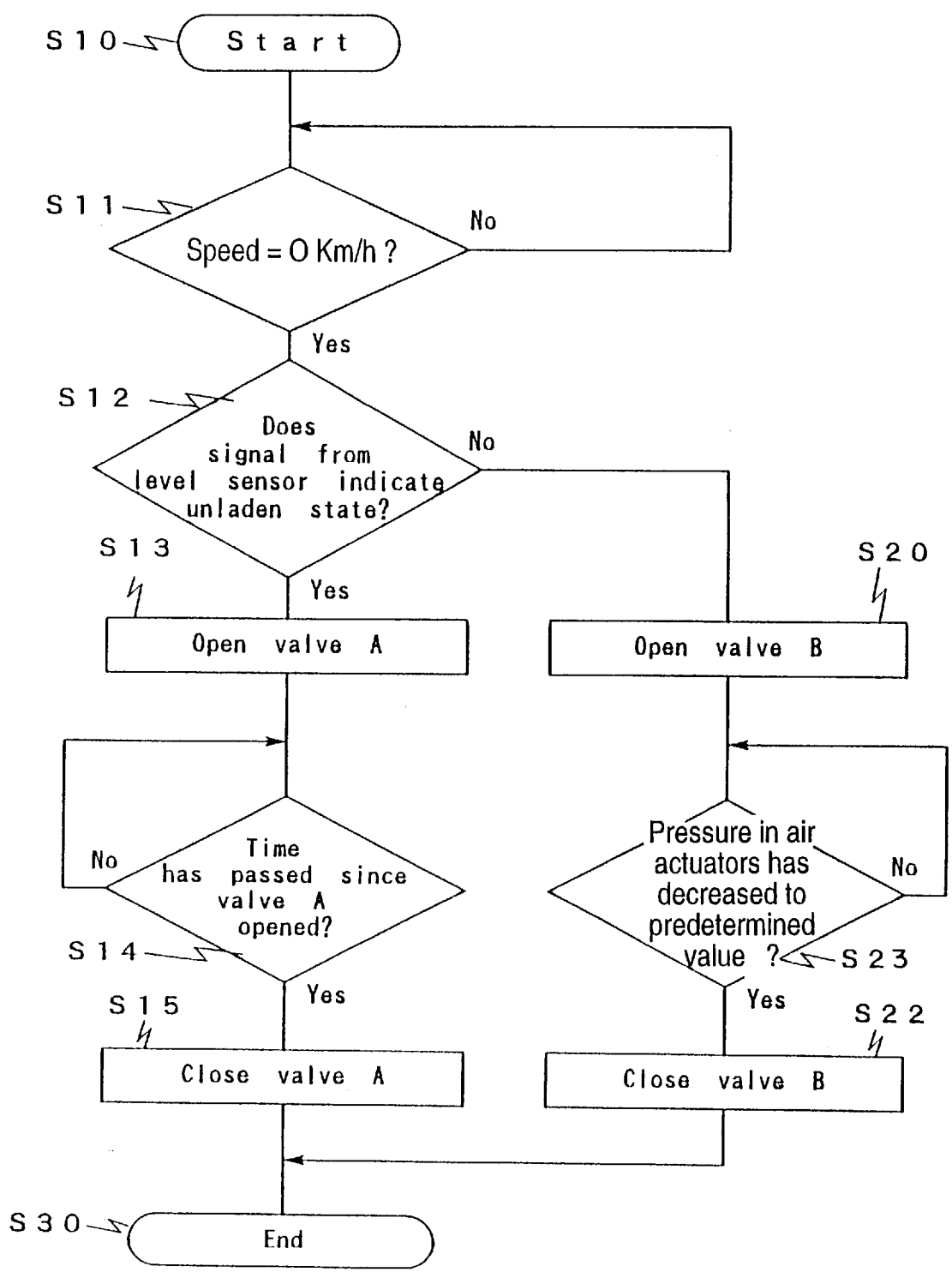
FIG. 11 is a flow chart of the process of controlling the control device according to the embodiment of FIG. 10.

FIG. 11 is a flow chart showing a process of control by the control device 800' shown in FIG. 10.

When step S12 determines that the vehicle is unladen, the flow continues as in FIG. 2. When S12 determines that the vehicle is laden, the flow proceeds to step S20 to activate the second valve (B) 840.

After the second valve (B) 840 is activated and starts releasing air from the air actuators in step S20, if it is detected in step S23 that the pressure in the air actuators 505 has decreased to the predetermined value and that the pressure detecting switch 870 has stopped its output, the valve is closed in step S22, and a residual pressure is left in the air actuators. The other steps of the flow are the same as those of the flow chart of FIG. 2.

Figure 12:
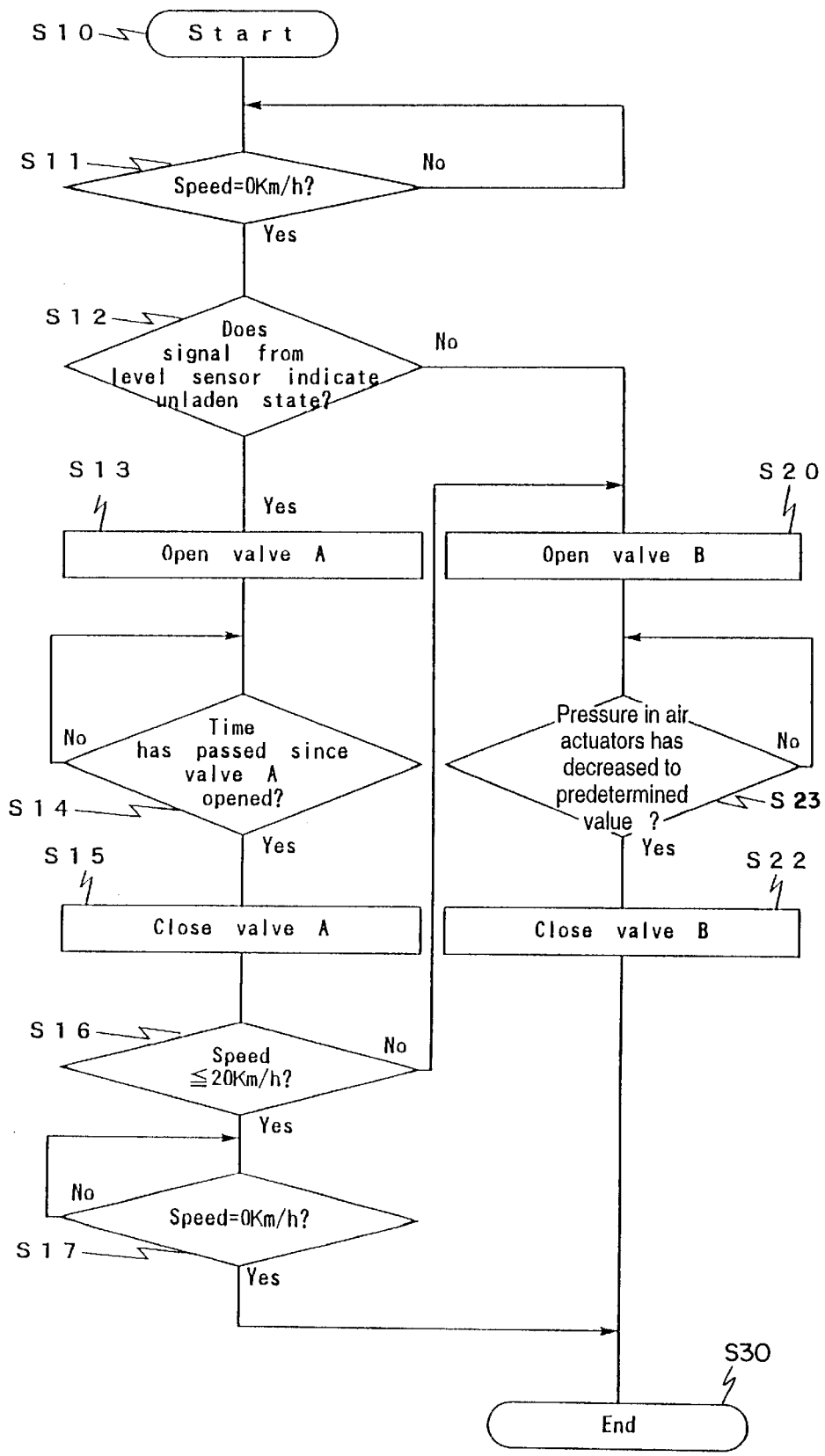
FIG. 12 is a flow chart of a modified process of control by the control device according to the embodiment of FIG. 10.

FIG. 12 is another flow chart showing the process of control by a modified version of the control device 800' of FIG. 10.

This process of control is substantially the same as the process of control shown in the flow chart of FIG. 11, except that, like the flow chart of FIG. 3, after step S15 has closed valve 812 and the speed of the vehicle has reached 20 Km/h in step S16, the flow goes to step S20 and opens the second valve 840 to release air from the air actuators 505 while keeping a residual pressure in the conduit 820. While the vehicle speed is at or below 20 Km/h, the speed is monitored in step S17, and if the vehicle stops, the process ends in step S30. Likewise, after step S22, the process ends at step S30.

According to the embodiments described above, in a vehicle having two rear axles, one of which behaves as a drive axle, and equipped with a start-assist system which includes air actuators attached to the drive axle and activated upon starting the vehicle to increase the load, the start-assist system is activated when it is detected that the vehicle is unladen and stopped, whereas the start-assist system is deactivated when it is detected that the vehicle is laden and stopped or when the speed of the vehicle exceeds a predetermined value. Therefore, the driver is not required to perform any operation except switching on the system switch, and the system is automatically deactivated when it is not required. Thus, the durability of the system is improved.

Moreover, since a residual pressure is left in the air actuators even when the start-assist system is inactivated, the residual pressure prevents collapsing of the air actuators and protects their diaphragms from damage.

What is claimed is:

1. A control device for a start-assist system in a vehicle having two rear axles, one in front of the others, the two rear axles including a drive axle and an idler axle, and the vehicle including at least one air actuator attached to the drive axle to increase the load to drive wheels mounted on the drive axle, said control device comprising:

a speed sensor for detecting the speed of the vehicle;

a level sensor for detecting loads applied to the axles;

an air supply source for supplying compressed air;

a first valve disposed in an air conduit for supplying air from said air supply source to the air actuator;

a second valve for releasing air from the air actuator;

a residual pressure valve disposed at an air discharge side of said second valve; and a control unit for controlling said first valve and said second valve, said control unit responsive to detecting that the vehicle is unladen and stopped, for opening said first valve to supply air to the air actuator, and responsive to detecting that the speed of the vehicle is above a predetermined value or that the vehicle is laden and stopped, for opening said second valve to release air from the air actuator, while leaving a residual air pressure therein in an amount determined by said residual pressure valve.

2. A control device as claimed in claim 1, wherein said control unit is further responsive to said first valve being open for a preset time, for closing said first valve.

3. A control device as claimed in claim 1, wherein said control unit is further responsive to said second valve being open for a preset time, for closing said second valve.

4. A control device for a start-assist system in a vehicle having two rear axles, one in front of the others, the two rear axles including a drive axle and an idler axle, and the vehicle including at least one air actuator attached to the drive axle to increase the load to drive wheels mounted on the drive axle, said control device comprising:

a speed sensor for detecting the speed of the vehicle;

a level sensor for detecting loads applied to the axles;

an air supply source for supplying compressed air;

a first valve disposed in an air conduit for supplying air from said air supply source to the air actuator;

a second valve for releasing air from the air actuator;

a pressure detecting switch for detecting the air pressure within said air actuator; and a control unit for controlling said first valve and said second valve, said control unit responsive to detecting that the vehicle is unladen and stopped for opening said first valve to supply air to the air actuator, responsive to detecting that the speed of the vehicle is above a predetermined values, or that the vehicle is laden and stopped, for opening said second valve to release air from the air actuator, and responsive to said pressure detecting switch detecting that the air pressure within the air actuator is below the predetermined pressure for closing said second valve to leave a residual air pressure in the air actuator in an amount determined by said pressure detecting switch.

5. A control device as claimed in claim 2, wherein said control unit is further responsive to said first valve being open for a preset time, for closing said first valve.

6. A control device as claimed in claim 2, wherein said pressure detecting switch provides an output signal when the air pressure within the air actuator is above the predetermined pressure, and said control unit is responsive to presence of the output signal for enabling opening of the second valve, and is responsive to absence of the output signal for closing said second valve.

7. A control device for a start-assist system in a vehicle having two rear axles, one in front of the other, the two rear axles including a drive axle and an idler axle, and the vehicle including at least one air actuator attached to the drive axle to increase the load to drive wheels mounted on the drive axle, said control device comprising:

a speed sensor for detecting the speed of the vehicle;

a level sensor for detecting loads applied to the axles;

an air supply source for supplying compressed air;

a first valve disposed in an air conduit for supplying air from said air supply source to the air actuator;

a second valve for releasing air from the air actuator; and control means for controlling said first valve and said second valve, said control means responsive to detecting that the vehicle is unladen and stopped, for opening said first valve to supply air to the air actuator, and responsive to detecting that the speed of the vehicle is above a predetermined value, or that the vehicle is laden and stopped, for opening said second valve to release air from the air actuator, while leaving a residual air pressure therein in an amount sufficient to inhibit collapsing of the air actuator.

8. A control device as claimed in claim 7, wherein said control means is further responsive to said first valve being open for a preset time, for closing said first valve.

9. A control device as claimed in claim 7, wherein said control means is further responsive to said second valve being open for a preset time, for closing said second valve.

10. A control device for a start-assist system in a vehicle having two rear axles, one in front of the other, the two rear axles including a drive axle and an idler axle, and the vehicle including at least one air actuator attached to the drive axle to increase the load to drive wheels mounted on the drive axle, said control device comprising:

a speed sensor for detecting the speed of the vehicle;

a level sensor for detecting loads applied to the axles;

an air supply source for supplying compressed air;

a first valve disposed in an air conduit for supplying air from said air supply source to the air actuator;

a second valve for releasing air from the air actuator;

a residual pressure valve disposed at an air discharge side of said second valve; and a control unit for controlling said first valve and said second valve, said control unit responsive to detecting that the vehicle is unladen and stopped, for opening said first valve to supply air to the air actuator, and responsive to detecting that the vehicle is laden and stopped, for opening said second valve to release air from the air actuator, while leaving a residual air pressure therein in an amount determined by said residual pressure valve.

11. A control device as claimed in claim 10, wherein said control unit is further responsive to said first valve being open for a preset time, for closing said first valve.

12. A control device as claimed in claim 10, wherein said control unit is further responsive to said second valve being open for a preset time, for closing said second valve.

13. A control device for a start-assist system in a vehicle having two rear axles, one in front of the other, the two rear axles including a drive axle and an idler axle, and the vehicle including at least one air actuator attached to the drive axle to increase the load to drive wheels mounted on the drive axle, said control device comprising:

a speed sensor for detecting the speed of the vehicle;

a level sensor for detecting loads applied to the axles;

an air supply source for supplying compressed air;

a first valve disposed in an air conduit for supplying air from said air supply source to the air actuator;

a second valve for releasing air from the air actuator;

a pressure detecting switch for detecting the air pressure within said air actuator; and a control unit for controlling said first valve and said second valve, said control unit responsive to detecting that the vehicle is unladen and stopped, for opening said first valve to supply air to said air actuator, responsive to detecting that the vehicle is laden and stopped, for opening said second valve to release air from the air actuator, and responsive to said pressure detecting switch detecting that the air pressure within the air actuator is below the predetermined pressure for closing said second valve to leave a residual air pressure in the air actuator in an amount determined by said pressure detecting switch.

14. A control device as claimed in claim 13, wherein said control unit is further responsive to said first valve being open for a preset time, for closing said first valve.

15. A control device as claimed in claim 13, wherein said pressure detecting switch provides an output signal when the pressure within the air actuator is above the predetermined pressure, and said control unit is responsive to presence of the output signal for enabling opening of the second valve, and is responsive to absence of the output signal for closing said second valve.

16. A control device for a start-assist system in a vehicle having two rear axles, one in front of the other, the two rear axles including a drive axle and an idler axle, and the vehicle including at least one air actuator attached to the drive axle to increase the load to drive wheels mounted on the drive axle, said control device comprising:

a speed sensor for detecting the speed of the vehicle;

a level sensor for detecting loads applied to the axles;

an air supply source for supplying compressed air;

a first valve disposed in an air conduit for supplying air from said air supply source to the air actuator;

a second valve for releasing air from the air actuator;

control means for controlling said first valve and said second valve, said control means responsive to detecting that the vehicle is unladen and stopped, for opening said first valve to supply air to the air actuator, and responsive to detecting that the vehicle is laden and stopped, for opening said second valve to release air from the air actuator, while leaving a residual air pressure therein in an amount sufficient to inhibit collapsing of the air actuator.

17. A control device as claimed in claim 16, wherein said control means is further responsive to said first valve being open for a preset time, for closing said first valve.

18. A control device as claimed in claim 16, wherein said control means is further responsive to said second valve being open for a preset time, for closing said second valve.

* * * * *